(12) United States Patent
Knight, Sr.

(10) Patent No.: US 6,368,053 B1
(45) Date of Patent: Apr. 9, 2002

(54) IMPELLER CLEARANCE ADJUSTMENT SYSTEM

(76) Inventor: Michael J. Knight, Sr., 396 Royce St., Pensacola, FL (US) 32503

( * ) Notice: Subject to any disclaimer, the term of this patent is extended or adjusted under 35 U.S.C. 154(b) by 0 days.

(21) Appl. No.: 09/714,289

(22) Filed: Nov. 17, 2000

(51) Int. Cl.[7] ............................. F01D 5/02; F03B 1/02

(52) U.S. Cl. .................. 415/132; 411/383; 411/395

(58) Field of Search .................. 411/383, 384, 411/393, 395; 415/131, 132

(56) References Cited

U.S. PATENT DOCUMENTS

| | | | |
|---|---|---|---|
| 5,951,244 A | | 9/1999 | Knight, Sr. .................. 415/132 |
| 5,961,266 A | * | 10/1999 | Tseng .......................... 411/383 |
| 6,116,942 A | * | 9/2000 | Chen et al. ............. 411/395 X |

* cited by examiner

Primary Examiner—John E. Ryznic
(74) Attorney, Agent, or Firm—Peter Loffler

(57) ABSTRACT

An impeller clearance adjustment system provides for the desired clearance between an impeller and suction housing irrespective of the amount of torque applied to the bolts of the adjustment system. A bearing housing has a plurality of generally evenly spaced apart threaded first openings while a bearing frame has a plurality of threaded second openings registerable with the first openings. A twinsert is threadably received within each of the plurality of second openings. An adjustment bolt, having an opening in its central axis, is threadably inserted into each of the first openings and abuts a face of a twinsert. An attachment bolt is inserted through each adjustment bolt's opening and is threadably received within the respective twinsert. Once the impeller clearance is set, each attachment bolt is tightened thereby maintaining the set impeller clearance.

4 Claims, 3 Drawing Sheets

IMPELLER CLEARANCE ADJUSTMENT SYSTEM

BACKGROUND OF THE INVENTION

1. Field of the Invention

The present invention relates to an attachment system for adjusting the clearance between an impeller and a suction housing of a standard impeller pump.

2. Background of the Prior Art

In a typical impeller pump the bearing housing and the bearing frame are two separate items attached to one another. A first series of generally evenly spaced apart bolts, typically three in number and referred to as attaching bolts, pass through the bearing housing and are threadably received within the bearing frame. A second series of generally spaced apart (from each other and from the first series of bolts) bolts, also typically three in number and referred to as held bolts, pass threadably through the bearing housing and abut the bearing frame. The clearance achieved between the bearing housing and the bearing frame (the impeller clearance) is on the order of a fraction of an inch with the precise clearance being pump size and model specific. The first series of bolts and the second series of bolts cooperatively work to achieve the desired clearance. Tightening of the first series of bolts draws the impeller closer to the bearing frame while tightening the second series of bolts moves the bearing housing further from the suction housing. Applying the proper torque to each series of bolts will produce the appropriate push and pull forces on the pump elements (shaft, bearings, impeller, and bearing housing) such that the desired clearance between the impeller, being held bearing housing via a shaft and bearing, and the suction housing that is attached to the bearing frame, is achieved and the pump operates with maximum efficiency.

If the bolts are torqued to factory specifications, the shaft acts as a lever and loads the floating bearing and angularly mis-aligns the held bearing. This removes the running clearance between the rotating balls of the bearing and the inner and outer races of the bearing greatly reducing the running life of the bearing. This also causes the pump to work hard and thereby operate less efficiently.

Therefore, there is a need in the art for a mechanism that will provide for the appropriate adjustment in order to achieve the appropriate clearance between the impeller and the suction housing without preloading the bearings. The mechanism must be simple in design and must be quick and easy to use. The device must not rely on specialized tools such as torque wrenches in order to achieve the desired result. The mechanism should be usable on newly manufactured pumps as well as pumps already installed in the field.

SUMMARY OF THE INVENTION

The impeller clearance adjustment system of the present invention addresses the aforementioned needs in the art. The device provides for a mechanism that allows quick, easy and accurate adjustment of the clearance between the impeller and the suction housing of an impeller pump without the need for a torque wrench or other specialized tool. The impeller clearance adjustment system can be implemented on newly manufactured pumps and can also be retrofit installed in existing pumps in the field.

The impeller clearance adjustment system is comprised of a first housing having a plurality of spaced apart first openings. A second housing has a plurality of spaced apart second openings registerable with the plurality of first openings. A plurality of twinserts are each received within one of the plurality of second openings. A plurality of adjustment bolts are provided, each bolt passes through a first opening in the bearing housing and abuts against a face of a twinsert. A bore opening passes through the central axis of each adjustment bolt. An attachment bolt passes through the opening of each adjustment bolt and is threadably received within the twinsert. The use of the twinsert allows for retrofit installment of the impeller clearance adjustment system of the present invention to be installed on existing pumps in the field. Once each bolt is properly positioned, the clearance between the impeller and the suction housing is established. Thereafter, each attachment bolt is tightened while the adjustment bolt is held. This simultaneous tightening ensures that the impeller does not move relative to the suction housing thereby maintaining the desired impeller clearance.

BRIEF DESCRIPTION OF THE DRAWINGS

Similar reference numerals refer to similar parts throughout the several views of the drawings.

DESCRIPTION OF THE PREFERRED EMBODIMENT

Figure 1:
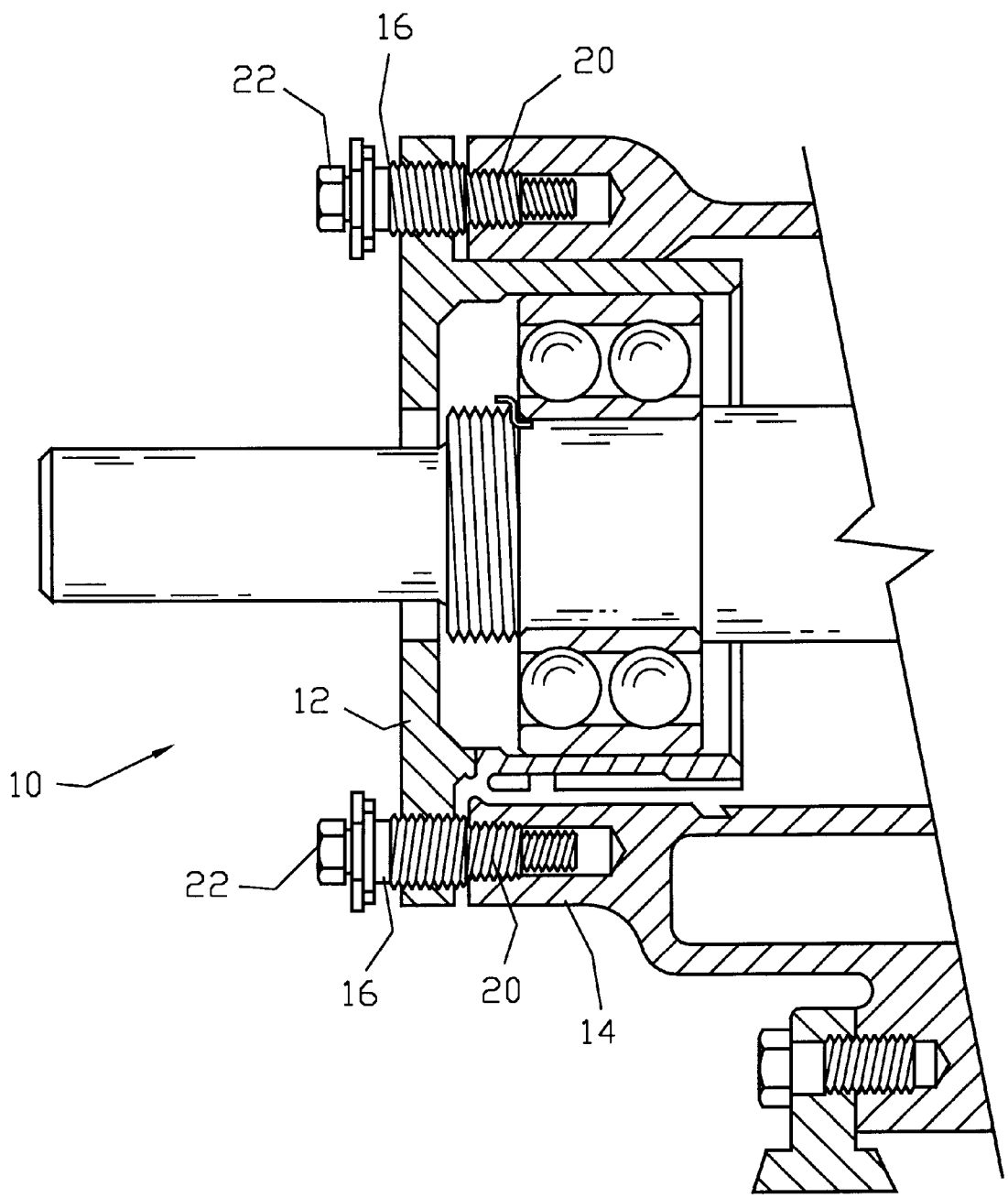
FIG. 1 is a sectioned side view of an impeller pump utilizing the impeller clearance adjustment system of the present invention.
Figure 2:
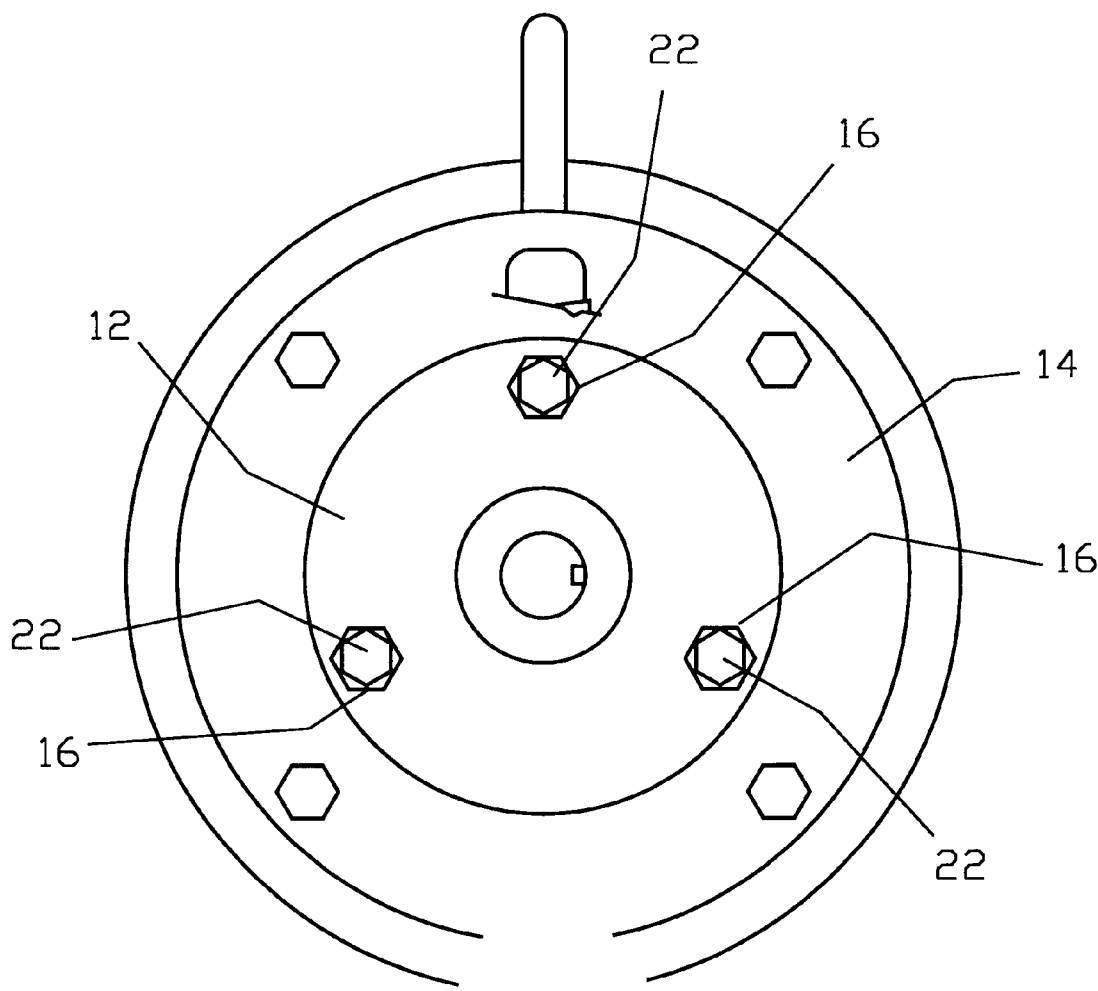
FIG. 2 is an end view of FIG. 1.

Referring now to the drawings, it is seen that the impeller clearance adjustment system is comprised of a bearing housing 12 and a bearing frame 14. The bearing housing 12 is of any desired design and has a plurality of generally evenly spaced apart threaded first openings. Likewise, the bearing frame 14 is of any desired design and has a plurality of spaced apart second openings registerable with the first openings of the bearing housing 12 when the bearing frame 14 is properly positioned relative to the bearing housing 12.

A plurality of twinserts 20 are provided and each is threadably installed within one of the second openings of the bearing frame 14.

Figure 3:
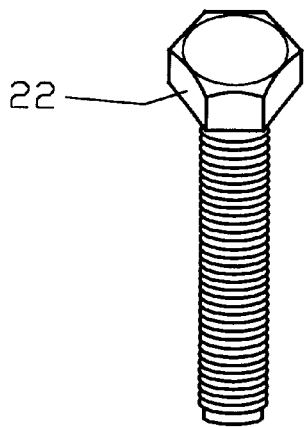
FIG. 3 is a perspective view of the adjustment bolt, the attachment bolt, and the twinsert.
Figure 3:
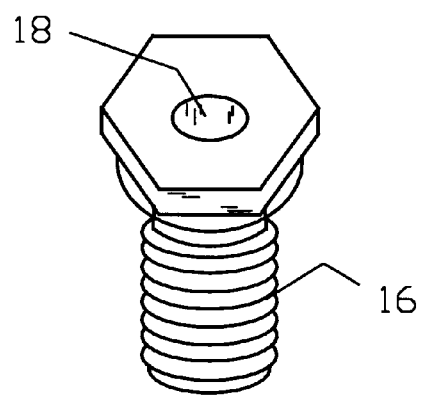
Figure 3:
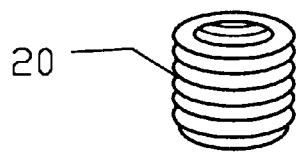

A threaded adjustment bolt 16 is threadably passed through a second opening of the bearing housing 12 and abuts a face of a twinsert 20. The end of each adjustment bolt 16 is squared. As seen in FIGS. 1 and 3, a bore opening 18 passes through the central axis of each adjustment bolt 16.

Once the bearing housing 12 and the bearing frame 14 are installed relative to each other, the first openings on the bearing housing 12 are aligned with the second openings on the bearing frame 14 and an adjustment bolt 16 is passed through each first opening of the bearing housing 12.

Thereafter, a threaded attachment bolt 22 is passed through the bore opening 18 of each adjustment bolt 16 and is threadably received within the twinsert 20 being held within the bearing frame 14. The attachment bolt 22 is dimensioned so that is can pass through the adjustment bolt bore opening 18 without undue hardship yet is relatively snug therein. The attachment bolt 22 is further dimensioned so that when it is fully received within the twinsert 20 (thus when each attachment bolt 22 has exerted its maximum draw on the bearing housing 12 relative to the bearing frame 14) the impeller clearance is at the smallest desired distance. Thereafter, the impeller clearance is set and each attachment bolt 22 is tightened while the adjustment bolt 16 is held from turning. The adjustment bolt 16 exerts a pushing force on the twinsert 20 and thus the bearing frame 14 to push the bearing housing 12 away from the bearing frame 14 when the adjustment bolt 16 is rotated into the bearing housing opening while the attachment bolt 22 exerts a drawing force on the bearing housing 12 drawing the bearing housing 12 toward the bearing frame 14 when the attachment bolt 22 is rotated into the bearing frame 14. Therefore, the two equal and opposite forces cancel each other and the tightening of attachment bolt 22 and holding adjustment bolt 16 will not disturb the impeller clearance distance irrespective of the amount of torque applied (within reason) to the attachment bolt 22.

While the invention has been particularly shown and described with reference to an embodiment thereof, it will be appreciated by those skilled in the art that various changes in form and detail may be made without departing from the spirit and scope of the invention.

I claim:

1. An attachment device comprising:
    a first housing having a plurality of spaced apart first openings;
    a second housing having a plurality of spaced apart second openings registerable with the plurality of first openings;
    a plurality of twinserts, each received within one of the plurality of second openings;
    a plurality of adjustment bolts, each having a bore opening passing through its central axis and each passing through one of the plurality of first openings and abutting a face of one of the plurality of twinserts; and
    a plurality of attachment bolts, each passing through one of the bore openings and being received within one of the plurality of twinserts.

2. The attachment device as in claim 1 wherein an end of each of the plurality of adjustment bolts is squared.

3. An impeller clearance adjustment system comprising:
    a bearing housing having a plurality of spaced apart first openings;
    a bearing frame having a plurality of spaced apart second openings registerable with the plurality of first openings;
    a plurality of twinserts, each received within one of the plurality of second openings;
    a plurality of adjustment bolts, each having a bore opening passing through its central axis and each passing through one of the plurality of first openings and abutting a face of one of the plurality of twinserts; and
    a plurality of attachment bolts, each passing through one of the bore openings and being received within one of the plurality of twinserts.

4. The impeller clearance adjustment system as in claim 3 wherein an end of each of the plurality of adjustment bolts is squared.

* * * * *